US010461286B2

(12) United States Patent
Lee et al.

(10) Patent No.: US 10,461,286 B2
(45) Date of Patent: Oct. 29, 2019

(54) BATTERY PACK (71) Applicant: LG CHEM, LTD., Seoul (KR)

(72) Inventors: Gang-U Lee, Daejeon (KR);
Sang-Yoon Jeong, Daejeon (KR);
Jun-Yeob Seong, Daejeon (KR);
Ki-Youn Kim, Daejeon (KR);
Sung-Chun Yu, Daejeon (KR);
Duck-Hee Moon, Daejeon (KR);
Jung-Hang Lee, Daejeon (KR);
Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/552,566

(22) PCT Filed: Jun. 15, 2016

(86) PCT No.: PCT/KR2016/006370
§ 371 (c)(1),
(2) Date: Aug. 22, 2017

(87) PCT Pub. No.: WO2016/204518
PCT Pub. Date: Dec. 22, 2016

(65) Prior Publication Data
US 2018/0047951 A1 Feb. 15, 2018

(30) Foreign Application Priority Data

Jun. 16, 2015 (KR) .................. 10-2015-0085238

(51) Int. Cl.
*H01M 2/10* (2006.01)
*H01M 10/613* (2014.01)
(Continued)

(52) U.S. Cl.
CPC ........... *H01M 2/10* (2013.01); *H01M 2/1077* (2013.01); *H01M 2/12* (2013.01);
(Continued)

(58) Field of Classification Search
CPC ... H01M 10/04; H01M 10/0413–0418; H01M 10/60–627; H01M 10/64;
(Continued)

(56) References Cited

U.S. PATENT DOCUMENTS 5,392,873 A * 2/1995 Masuyama ............. B60R 16/04
180/68.5
2010/0136420 A1 6/2010 Shin et al.
(Continued)

FOREIGN PATENT DOCUMENTS

JP          2007-207523 A     8/2007
KR   10-2006-0037605 A        5/2006
(Continued)

OTHER PUBLICATIONS

Machine Translation of Kim et al. KR 10-2012-0122000 (Year: 2012).*
(Continued)

*Primary Examiner* — Jonathan G Leong
*Assistant Examiner* — Jacob Buchanan
(74) *Attorney, Agent, or Firm* — Birch, Stewart, Kolasch & Birch, LLP (57) ABSTRACT The present disclosure discloses a battery pack suitable for improving cooling efficiency of a cooling duct for battery cells in a battery module by reducing a sealing area between a lower case and an upper case configured to fully surround the battery module. The battery pack according to the present disclosure includes a battery module including battery cells sequentially stacked and a cooling duct located on side of the battery cells; a lower case configured to load the battery module and the cooling duct therein; and an upper case coupled to the lower case so as to cover the battery module and the cooling duct, the upper case having a vent structure on the cooling duct. The vent structure has, on the
(Continued)

cooling duct, an inner air passage unit opened at a sidewall of the upper case, and an outer air passage unit inserted into the inner air passage unit.

21 Claims, 9 Drawing Sheets

(51) Int. Cl.
| | |
|---|---|
| *H01M 10/6557* | (2014.01) |
| *H01M 2/12* | (2006.01) |
| *H01M 10/04* | (2006.01) |
| *H01M 10/625* | (2014.01) |
| *H01M 10/655* | (2014.01) |
| *H01M 10/6563* | (2014.01) |
| *H01M 2/04* | (2006.01) |

(52) U.S. Cl.
CPC ..... *H01M 10/0413* (2013.01); *H01M 10/613* (2015.04); *H01M 10/625* (2015.04); *H01M 10/655* (2015.04); *H01M 10/6557* (2015.04); *H01M 10/6563* (2015.04); *H01M 2/043* (2013.01); *H01M 2/1252* (2013.01); *H01M 2220/20* (2013.01)

(58) Field of Classification Search
CPC ....... H01M 10/647; H01M 10/65–651; H01M 10/655–6569; H01M 2/02–0237; H01M 2/04–043; H01M 2/0456; H01M 2/0469–0473; H01M 2/10–1083
See application file for complete search history.

(56) References Cited

U.S. PATENT DOCUMENTS

| | | | | |
|---|---|---|---|---|
| 2010/0307848 | A1* | 12/2010 | Hashimoto | B60K 1/04 180/68.5 |
| 2012/0214034 | A1* | 8/2012 | Minokawa | H01M 2/1077 429/83 |
| 2013/0298586 | A1* | 11/2013 | Hwang | B60K 1/04 62/239 |
| 2014/0030565 | A1* | 1/2014 | Lim | H01M 2/1077 429/82 |
| 2014/0050966 | A1* | 2/2014 | Merriman | H01M 2/1061 429/156 |
| 2015/0099146 | A1 | 4/2015 | Kim et al. | |

FOREIGN PATENT DOCUMENTS

| | | |
|---|---|---|
| KR | 10-2008-0027506 A | 3/2008 |
| KR | 10-2012-0076752 A | 7/2012 |
| KR | 10-2012-0122000 A | 11/2012 |
| KR | 10-2013-0126159 A | 11/2013 |
| KR | 10-2014-0057717 A | 5/2014 |
| KR | 10-2014-0110232 A | 9/2014 |
| KR | 10-2015-0044599 A | 4/2015 |

OTHER PUBLICATIONS

International Search Report for PCT/KR2016/006370 (PCT/ISA/210) dated Sep. 12, 2016.

* cited by examiner

BATTERY PACK

TECHNICAL FIELD

The present application claims priority to Korean Patent Application No. 10-2015-0085238 filed on Jun. 16, 2015 in the Republic of Korea, the disclosure of which is incorporated herein by reference.

The present disclosure relates to a battery pack suitable for improving cooling effects of an internal structure by flattening sealing surfaces of external structures to sufficiently surround the internal structure by using the external structures.

BACKGROUND ART

Recently, to reduce air pollution caused by exhaust gas of vehicles, the vehicles are being manufactured on the basis of research to ensure driving force by using an internal-combustion engine and/or an electric motor. Thus, the vehicles have evolved in the order of a hybrid vehicle, a plug-in hybrid vehicle, and an electric vehicle. In this case, the hybrid vehicle and the plug-in hybrid vehicle have an internal-combustion engine, an electric vehicle, and a battery pack, and the electric vehicle has an electric motor and a battery pack without an internal-combustion engine. In this case, the hybrid vehicle and the plug-in hybrid vehicle have an internal-combustion engine, an electric motor and a battery pack, and the electric vehicle has an electric motor and a battery pack without an internal-combustion engine.

In addition, the battery pack has also evolved with hybrid vehicles, plug-in hybrid vehicles, and electric vehicles. The battery pack is configured to be capable of being charged by power supplied from the outside of an electric vehicle or power produced in the electric vehicle. The battery pack has cooling ducts and a battery module between a lower case and an upper case. The cooling ducts introduce air from the outside to the inside of the battery pack so as to cool battery cells of the battery module using the air, and continuously discharge from the inside toward the outside of the battery pack.

Here, the cooling ducts are partially exposed to the outside air from an outer wall of the battery pack to suck air from the outside of the battery pack. Also, the upper case is curved according to shapes of the cooling ducts and closely attached to the lower case and the cooling ducts using a sealing member. However, if the cooling duct and the upper case are not matched, the cooling duct and the upper case have an unnecessary space between the cooling duct and the sealing member or between the sealing member and the upper case. The unnecessary space partially discharges the air to be introduced into the battery module via the cooling duct, thereby degrading the cooling performance of the cooling duct.

Accordingly, a shape of the cooling duct installed between the lower case and the upper case greatly affects cooling effects of battery cells per unit time. Many studies have been conducted on the shape of the cooling duct. One example of the studies has been disclosed in Korean Patent Laid-Open Publication No. 10-2012-0122000 (published on Nov. 7, 2012), entitled 'Battery Pack with Inlet and Outlet Optimization Structure'. The battery pack has a cell module, an inlet duct, and an outlet duct in an outer case, and has an inlet cover and an outlet cover on an upper side of the outer case.

The inlet duct communicates with the inlet cover, and the outlet duct communicates with the outlet cover. Here, the inlet cover and the outlet cover are respectively located on different sides of the outer case. However, in the case of the battery pack, the outside air sequentially passes through the inlet cover, the inlet duct, the battery cells of the cell module, the outlet duct, and the outlet cover, so that battery cells located near the outlet cover may accumulate heat under the influence of hot air that has exchanged heat with other battery cells. The heat accumulation of some of the battery cells deteriorates electrical characteristics of the battery module.

DISCLOSURE

Technical Problem

The present disclosure is designed to solve the problems of the related art, and therefore the present disclosure is directed to providing a battery pack having a structure suitable for reducing a sealing area between a lower case and an upper case, which are sequentially stacked, and improving cooling efficiency of a cooling duct for battery cells of a battery module between the lower case and the upper case.

Technical Solution

In one aspect of the present disclosure, there is provided a battery pack including a battery module including battery cells sequentially stacked, air flow paths located between the battery cells, and a cooling duct located on side of the battery cells to define an air flow space configured to communicate with the air flow paths, the cooling duct having an air passing hole opened toward an upper portion of the battery module to communicate with the air flow space; a lower case configured to load the battery module and the cooling duct therein; and an upper case coupled to the lower case and configured to cover the battery module and the cooling duct, the upper case having a vent structure on the cooling duct. The vent structure includes an inner air passage unit configured to define an air passage and having a rectangular-tunnel-type window frame configured to communicate with the air passing hole through one side of the air passage and penetrate a sidewall of the upper case through the other side of the air passage, and an outer air passage unit inserted along an inner wall of the window frame, the outer air passage unit having through holes in a front wall located on a front side of the window frame and in a rear wall located on a rear side of the window frame.

According to the present disclosure, the lower case may have an end portion located at the same level along an upper edge thereof, and be closely attached to the upper case through a sealing member along the upper edge of the lower case.

According to the present disclosure, the battery pack further includes battery cartridges interposed between the battery cells. Each of the battery cartridges may include an outer frame; a lower cooling fin and an upper cooling fin fixed to an edge of the outer frame and spaced a predetermined distance apart from each other; and air induction tools located on both sides of the outer frame so as to expose an air flow path between the lower cooling fin and the upper cooling fin to the outside.

According to the present disclosure, the cooling duct opens toward the air induction tools of each of the battery cartridges through the air flow space.

The air passing, hole of the cooling duct may be lower than an uppermost level of the battery module.

In one aspect, the battery module may include a plurality of cooling ducts on both sides thereof, and the air passing holes of the respective cooling ducts may be located at the same level.

In another aspect, the cooling duct may be surrounded by the lower case and the upper case.

In another aspect, two cooling ducts may be located on each of both sides of the battery cells.

According to the present disclosure, at least one vent structure may be located at a sidewall of an edge of a long side of the upper case.

The inner air passage unit may surround the outer air passage unit.

In one aspect, the inner air passage unit may be tightly coupled to an edge of the air passing hole of the cooling duct through a sealing member.

In another aspect, the inner air passage unit may include the rectangular-tunnel-type window frame located at a sidewall of a housing of the upper case, a connection end configured to form a step from a front side to a rear side of the window frame on a lower side of the window frame, a strap-shaped latching protrusion protruding from an inner wall of the window frame along an inner edge of the window frame on the connection end, and a partition wall protruding from the housing toward the cooling duct on an opposite side of the connection end.

According to the present disclosure, the inner air passage unit may have flow-path connection units at an inner end portion of the connection end and an end portion of the partition wall in a lower portion of the housing of the upper case, and the flow-path connection units may be in contact with an edge of the air passing hole of the cooling duct.

The flow-path connection unit may have an inverted V-shaped groove structure at an end portion thereof.

In one aspect, each of the flow-path connection units may have a sealing member in the groove structure and be closely attached to the air passing hole through the sealing member.

Selectively, both sidewalls of the window frame may have fastening pieces protruding from the latching protrusion toward the partition wall at rear end portions thereof.

According to the present disclosure, on one side of the upper case, the outer air passage unit may allow the inflow of air through the front wall and through a downward bottom between the front wall and the rear wall and allow the outflow of air from the rear wall toward the inner air passage unit.

On the other side of the upper case, the outer air passage unit may allow the inflow of air from the inner air passage unit toward the rear wall and allow the outflow of air through the front wall and through the downward bottom between the front wall and the rear wall.

In one aspect, the outer air passage unit may have hooks, which protrude from the rear wall and are coupled to the fastening pieces of the inner air passage unit.

In another aspect, the outer air passage unit may have sidewalls between the front wall and the rear wall, and each of the sidewalls may protrude from a downward bottom under the front wall and the rear wall. The height of a protruding portion of each of the sidewalls may gradually decrease from the front wall toward the rear wall.

In another aspect, the downward bottom may have through holes.

Advantageous Effects

In a battery pack according to the present disclosure, a sealing member is located at the same level along the entire end portion of a lower case between the lower case and an upper case that are sequentially stacked, so that a sealing area between the lower case and the upper case may be small. Thus, the battery pack has no unnecessary space between the lower case and the sealing member or between the sealing member and the upper case.

The battery pack according to the present disclosure includes cooling ducts and a battery module between the lower case and the upper case and has no unnecessary space between an edge of the lower case and an edge of the upper case, thereby improving cooling efficiency of the cooling ducts included in the battery module.

The battery pack according to the present disclosure includes cooling ducts respectively located on both sides of the battery module between the lower case and the upper case and vent structures configured to respectively communicate with the cooling ducts in the upper case. Thus, the battery pack may rapidly introduce and discharge air into and from a plurality of regions of the upper case by using the vent structures and the cooling ducts, and cool battery cells of the battery module in a short amount of time.

Since the battery pack according to the present disclosure has a small sealing area between the lower case and the upper case and improves cooling efficiency of the cooling ducts for the battery module, an internal pressure between the lower case and the upper case, which is generated due to heat of the battery cells in the battery module, may be appropriately reduced during the driving of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the embodiments described below, a battery cell refers to a lithium secondary battery. Here, the lithium secondary battery is collectively referred to as a secondary battery in which lithium ions act as working ions during charging and discharging to cause an electrochemical reaction between a positive electrode and a negative electrode. However, it should be clear that the present disclosure is not limited to the kind of batteries.

Figure 1:
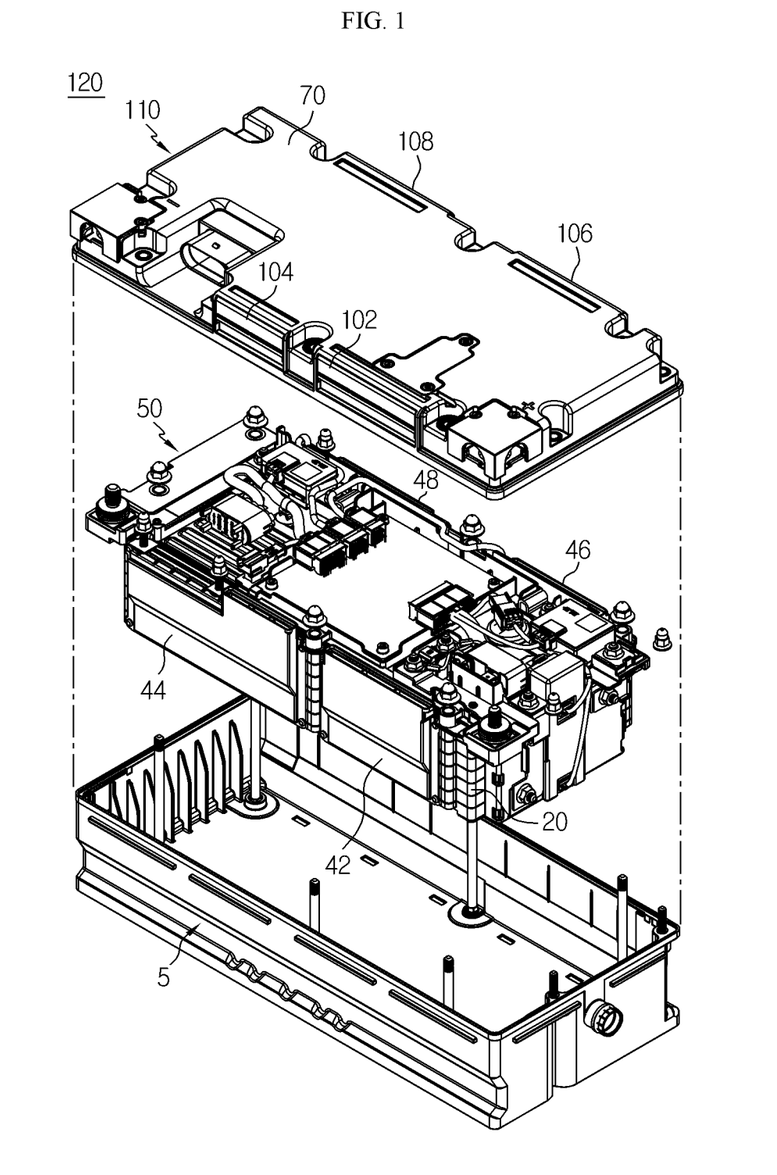
FIG. 1 is an exploded perspective view of a battery pack according to an embodiment of the present disclosure.
Figure 2:
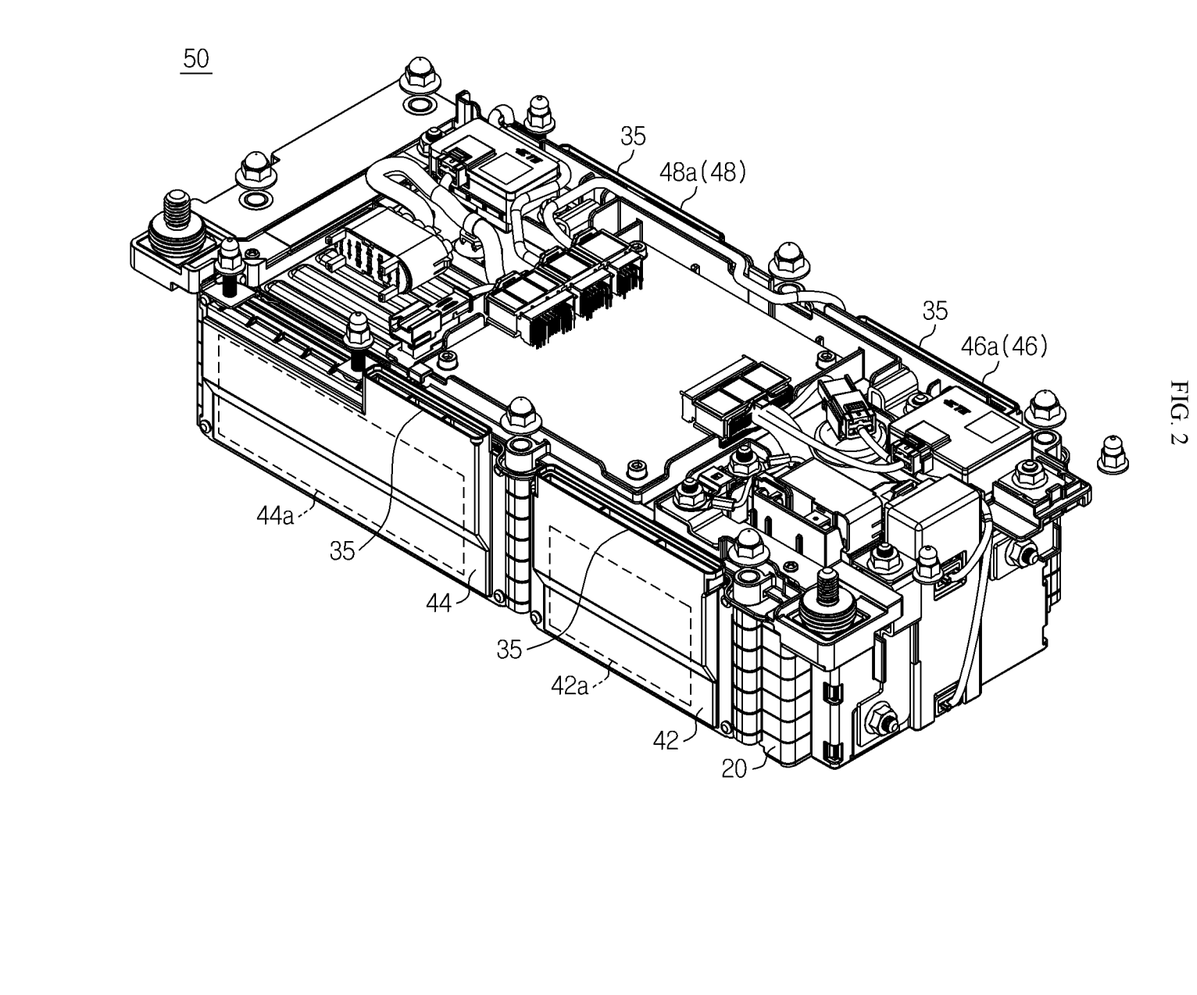
FIG. 2 is a perspective view of the battery module of FIG. 1.
Figure 3:
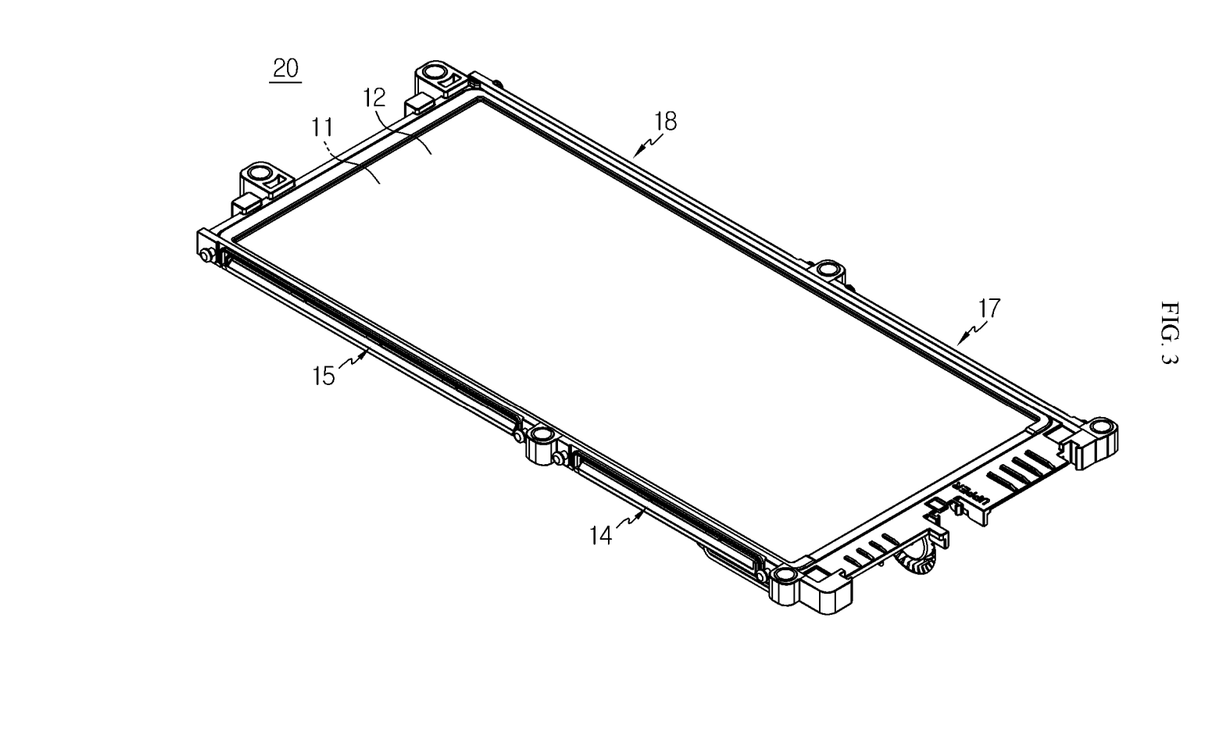
FIG. 3 is a detailed perspective view of the battery cartridge of FIG. 2.

FIG. 1 is an exploded perspective view of a battery pack according to an embodiment of the present disclosure. FIG. 2 is a perspective view of the battery module of FIG. 1. FIG. 3 is a detailed perspective view of the battery cartridge of FIG. 2.

Referring to FIGS. 1 to 3, a battery pack 120 according to the present disclosure includes a lower case 5, a battery module 50, and an upper case 110. The lower case 5 opens toward the upper case 110 so as to accommodate the battery module 50. In an aspect, the lower case 5 has an end portion located at the same level along an upper edge thereof.

The battery module 50 includes battery cartridges 20 having cooling flow paths and cooling ducts 42, 44, 46, and 48 configured to introduce air into the cooling flow paths or discharge air from the cooling flow paths. The battery cartridges 20 are sequentially stacked in the battery module 50. Two adjacent ones of the battery cartridges 20 may accommodate one or two battery cells (refer to C in FIG. 10) therebetween.

The cooling ducts 42, 44, 46, and 48 are respectively located on the sides of the battery cartridges 20. The cooling ducts 42, 44, 46, and 48 may allow air to flow into the respective cooling flow paths of the battery cartridges 20 and cool, by the air, the battery cells C accommodated between the battery cartridges 20. In an aspect, each of the cooling ducts 46 and 48 has a blowing fan (not shown).

When the blowing fan is driven, the blowing fan sucks air from the outside through the cooling ducts 42, 44 so that air may flow into each of the cooling flow paths of the battery cartridges 20. The air exchanges heat with the battery cells C accommodated between the battery cartridge 20, flows from the cooling flow paths toward the cooling ducts 46 and 48, and is discharged to the outside through the cooling ducts 46 and 48.

The upper case 110 has an end portion that opens toward the lower case 5 and located at the same level along a lower edge thereof. The end portion of the upper case 110 faces the end portion of the lower case 5. The upper case 110 includes vent structures 102, 104, 106, and 108 in a box-shaped housing 70 that covers an upper portion of the battery module 50.

The vent structures 102, 104, 106, and 108 are located over the cooling ducts 42, 44, 46, and 48 on a one-to-one basis. The vent structures 102, 104, 106, and 108 are configured to guide the inflow of air from the outside to the inside of the upper case 110 or guide the outflow of air from the inside to the outside of the upper case 110.

As shown in FIG. 2, the battery module 50 has cooling ducts 42, 44, 46, and 48 that are tightly coupled to both side portions of the battery cartridges 20. The cooling ducts 42, 44, 46, and 48 are located between the lower case 5 and the battery cartridges 20. Each of the cooling ducts 42, 44, 46, and 48 has an air passing hole 35 that opens toward the upper case 110.

The cooling ducts 42, 44, 46, and 48 open toward side portions of the battery cartridges 20 under the air passing holes 35. More specifically, the cooling ducts 42, 44, 46, and 48 have grooves 42a, 44a, 46a, and 48a that open toward the side portions of the battery cartridges 20 under the air passing holes 35. The grooves 42a, 44a, 46a, and 48a have respective square edges and are attached to the battery cartridges 20 through sealing members interposed in the respective square edges.

The grooves 42a, 44a, 46a, and 48a provide spaces for smooth flow of air introduced or discharged through the air passing holes 35. The spaces communicate with the air passing holes 35. The air passing holes 35 may be lower than an uppermost level of the battery module 50. The air passing holes 35 of the cooling ducts 42, 44, 46, and 48 may be located at the same level.

The battery cartridge 20 includes a lower cooling fin 11 and an upper cooling fin 12 as shown in FIG. 3. The lower cooling fin 11 and the upper cooling fin 12 are spaced apart from each other and fixed to an outer frame of the battery cartridge 20 by using an insert injection molding process. The battery cartridge 20 has air induction tools 14, 15, 17, and 18 on sides thereof, which are covered by the cooling ducts 42, 44, 46, and 48 in a lengthwise direction.

The air induction tools 14, 15, 17, and 18 communicate with grooves 42a, 44a, 46a, and 48a of the cooling ducts 42, 44, 46, and 48. Each of the air induction tools 14, 15, 17, and 18 has a slit-type opening in a lengthwise direction of the battery cartridge 20. The slit-type opening serves as a passage through which air is introduced from each of the cooling ducts 42, 44, 46, and 48 and discharged toward each of the cooling ducts 42, 44, 46, and 48.

The air induction tools 14, 15, 17, and 18 expose an air flow path (not shown) located between the lower cooling fin 11 and the upper cooling fin 12 of the battery cartridge 20 to the outside of the battery cartridge 20.

Figure 4:
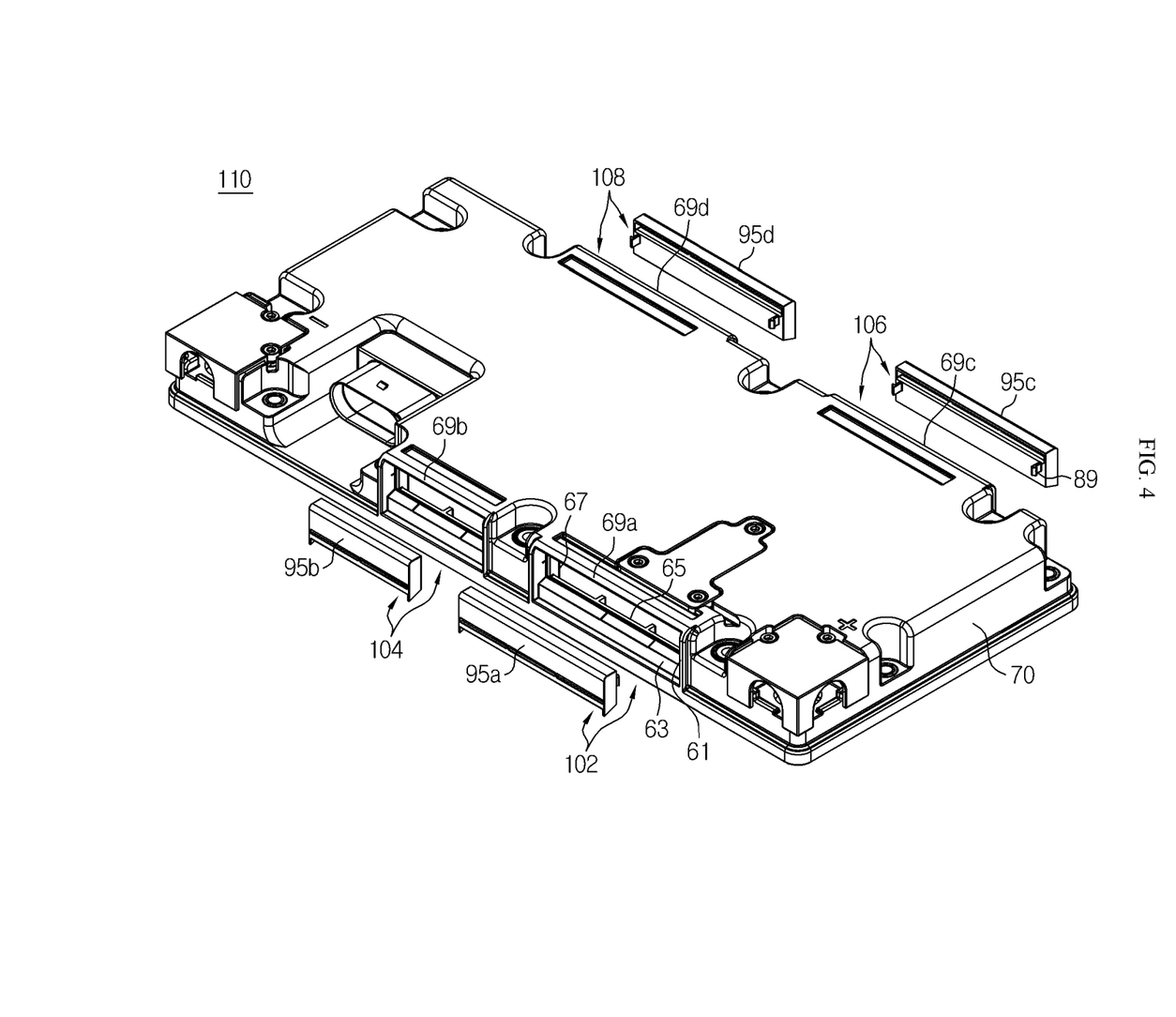
FIG. 4 is an exploded perspective view of a structure of an upper case of FIG. 1.
Figure 5:
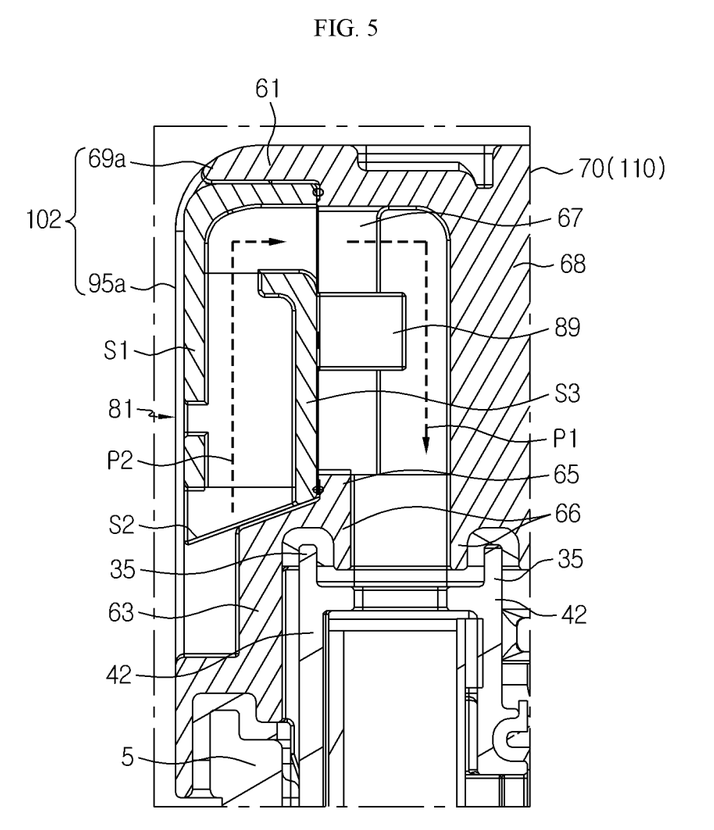
FIG. 5 is a detailed partial cross-sectional view showing a coupling relationship between a lower case, the upper case, and a cooling duct of FIG. 1.

FIG. 4 is a detailed exploded perspective view of a structure of the upper case of FIG. 1. FIG. 5 is a detailed partial cross-sectional view showing a coupling relationship between the lower case, the upper case, and the cooling duct of FIG. 1.

Referring to FIGS. 4 and 5, the upper case 110 has a plurality of vent structures 102, 104, 106, and 108. The vent structures 102, 104, 106, and 108 are located at an edge of a long side of the upper case 110. The vent structure 102 has an inner air passage unit 69a and an outer air passage unit 95a that may be detachably attached to the inner air passage unit 69a. The vent structure 104 has an inner air passage unit 69b and an outer air passage unit 95b that may be detachably attached to the inner air passage unit 69b.

Similarly, the vent structure 106 has an inner air passage unit 69c and an outer air passage unit 95c that may be detachably attached to the inner air passage unit 69c. The vent structure 108 has an inner air passage unit 69d and an outer air passage unit 95d that can be detachably attached to the inner air passage unit 69d. The inner air passage unit 69a has a shape and a structure similar to those of the remaining inner air passage units 69b, 69c, and 69d. However, when compared with the remaining inner air passage units 69b, 69c, and 69d, the difference is only in size.

The outer air passage unit 95c has a shape and a structure similar to those of the remaining outer air passage units 95b, 95c, and 95d. However, when compared with the remaining outer air passage units 95b, 95c, and 95d, the difference is only in size of the entire structure. Accordingly, for brevity, the vent structure 102 may be selected to collectively describe the remaining vent structures 104, 106, and 108.

In the vent structure 102, the inner air passage unit 69a includes a rectangular-tunnel-type window frame 61 located at a sidewall of the housing 70 of the upper case 110. The inner air passage unit 69a includes a connection end 63 configured to form a step from a front side to a rear side of the window frame 61 on a lower side of the window frame 61, a strap-shaped latching protrusion 65 protruding from an inner wall of the window frame 61 along an inner edge of the window frame 61 on the connection end 63, and a partition wall 68 spaced apart from the connection end 63 and vertically protruding from an upper inner wall of the housing 70 toward the cooling duct 42.

The inner air passage unit 69a has flow-path connection units 66 at an inner end portion of the connection end 63 and an end portion of the partition wall 68, and the flow-path connection units 66 are in close contact with edges of the air passing holes 35 of the cooling duct 42. Each of the flow-path connection units 66 has an inverted 'U'-shaped groove structure and may have a sealing member in the groove structure. In one aspect, both sidewalls of the window frame 61 have fastening pieces 67 protruding from the latching protrusion 65 toward the partition wall 68 at rear end portions thereof.

In another aspect, the inner air passage unit 69a defines a roughly "┐"-shaped air passage P1 inside the housing 70 of the upper case 110. In the vent structure 102, the outer air passage unit 95a may be aligned with the inner air passage unit 69a. The outer air passage unit 95a may couple hooks 89, which protrude toward the inner air passage unit 69a, to fastening pieces 67 so that the outer air passage unit 95a may be coupled to the inner air passage unit 69a.

Figure 6:
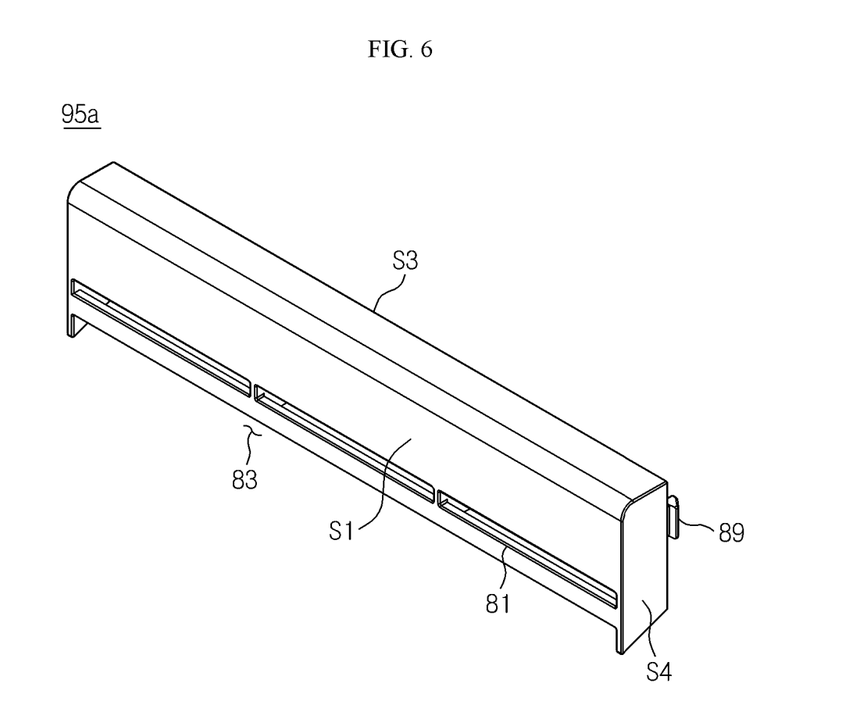
FIG. 6 is a detailed perspective view of a front wall of an outer air passage unit of FIG. 4.
Figure 7:
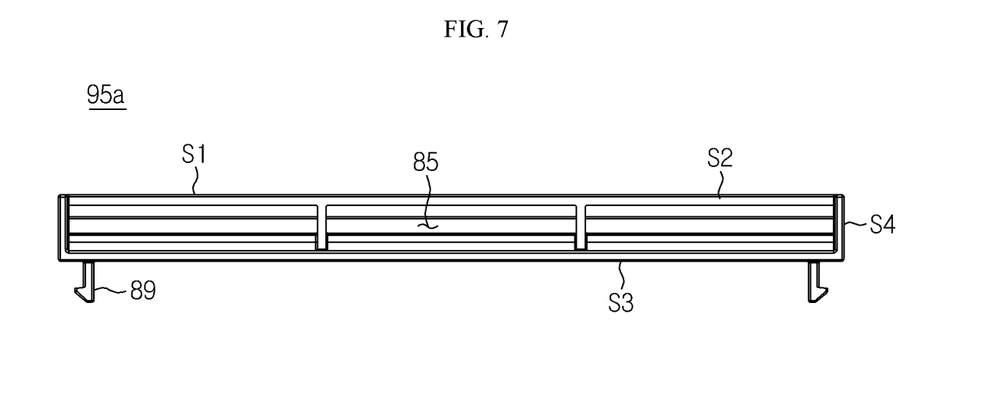
FIG. 7 is a detailed plan view of a downward bottom of the outer air passage unit of FIG. 4.
Figure 8:
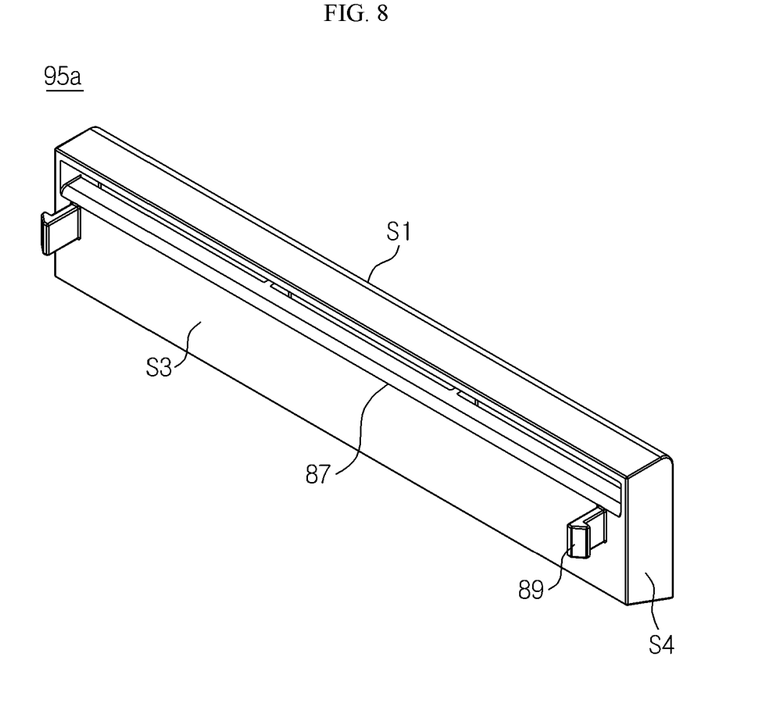
FIG. 8 is a detailed perspective view of a rear wall of the outer air passage unit of FIG. 4.

FIG. 6 is a detailed perspective view of a front wall of the outer air passage unit of FIG. 4. FIG. 7 is a detailed plan view of a downward bottom of the outer air passage unit of FIG. 4. FIG. 8 is a detailed perspective view of a rear wall of the outer air passage unit of FIG. 4.

Referring to FIGS. 6 to 8, the outer air passage unit 95a has a hollow rectangular pillar shape. More specifically, the outer air passage unit 95a has through holes 81 located at an edge of a lower side of a front wall S1, through holes 85 located at a downward bottom S2 between the front wall S1 and a rear wall S3, through holes 87 located at an edge of an upper side of the rear wall S3, and hooks 89 protruding from the rear wall S3.

When the outer air passage unit 95a is coupled to the inner air passage unit 69a as shown in FIG. 5, the front wall S1 is exposed to the air outside the inner air passage unit 69a, the rear wall S3 is located in the inner air passage unit 69a, and the downward bottom S2 is located toward a lower portion of the inner air passage unit 69a.

The outer air passage unit 95a has sidewalls S4 between the front wall S1 and the rear wall S3. Each of the sidewalls S4 protrudes from the downward bottom S2 under the front wall S1 and the rear wall S3, and the height of a protruding portion of each of the sidewalls S4 gradually decreases from the front wall S1 toward the rear wall S3. Here, the downward bottom S2 and the protruding portions of the sidewalls S4 form a space (refer to 83 in FIG. 6) under the downward bottom S2.

In one aspect, as shown in FIG. 5, the outer air passage unit 95a defines a roughly "┌"-shaped air passage P2 between the front wall S1 and the rear wall S3. When the outer air passage unit 95a is inserted into the inner air passage unit 69a as shown in FIG. 5, the air passage P2 of the outer air passage unit 95a communicates with the air passage P1 of the inner air passage unit 69a in the housing 70 of the upper case 110.

Figure 9:
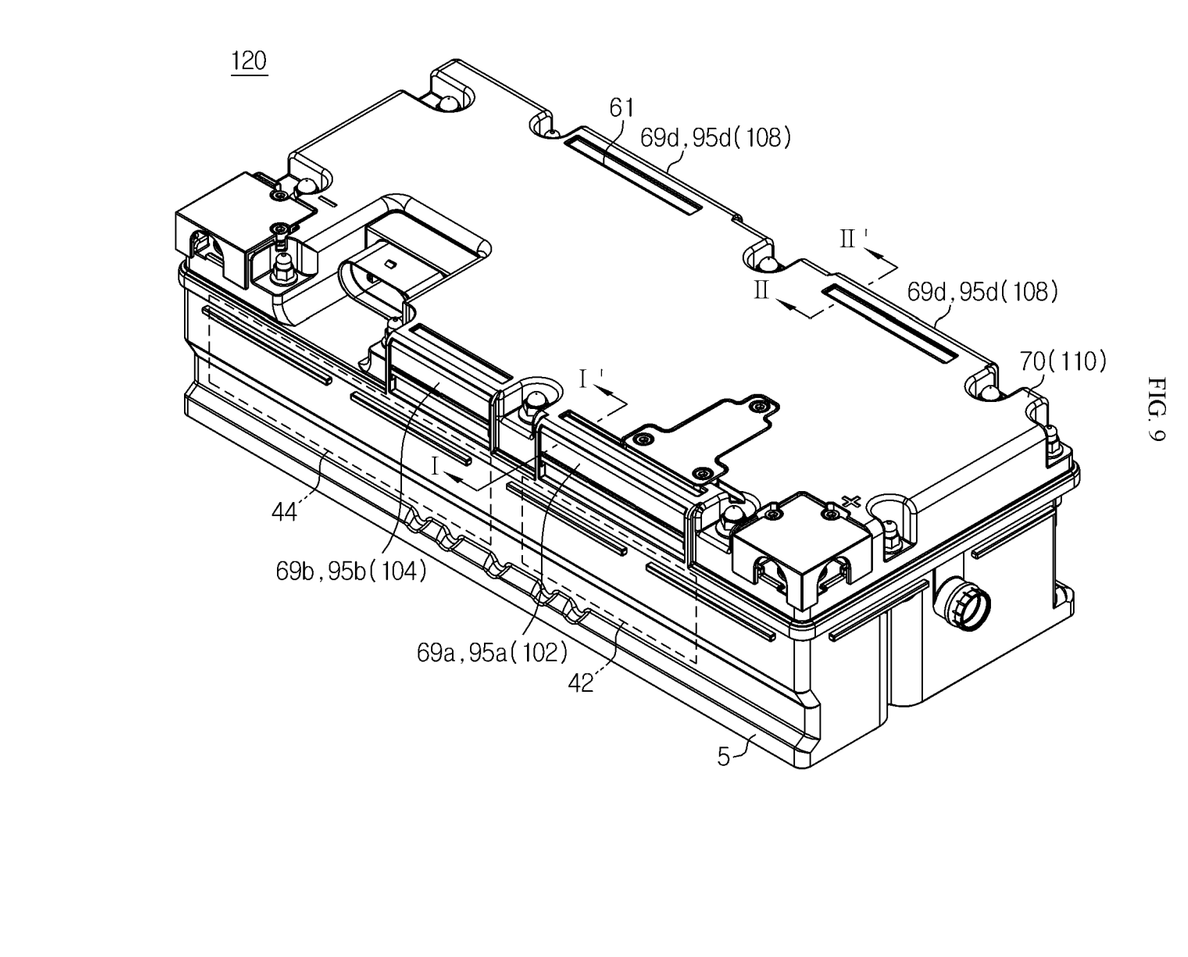
FIG. 9 is a perspective view of the battery pack of FIG. 1.
Figure 10:
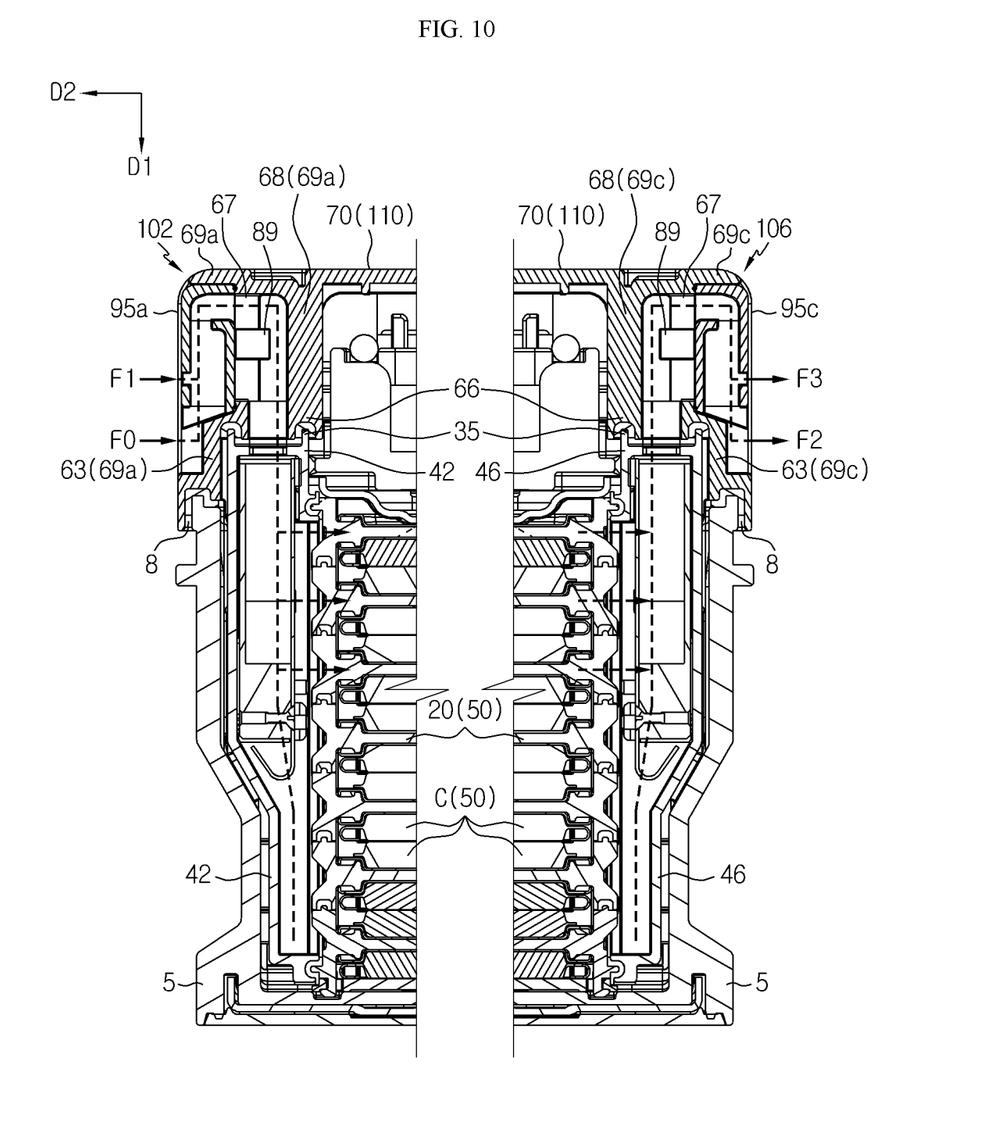
FIG. 10 is a partial cross-sectional view of the battery pack, which is taken along cutting lines I-I' and II-II' of FIG. 9.

FIG. 9 is a perspective view of the battery pack of FIG. 1, and FIG. 10 is a partial cross-sectional view of the battery pack, which is taken along cutting lines I-I' and II-II' of FIG. 9.

Referring to FIGS. 9 and 10, in the battery cartridge 120, the lower case 5 is covered by the upper case 110. Here, an upper edge of the lower case 5 is closely attached to a lower edge of the upper case 110 through a sealing member 8. Also, the lower case 5 and the upper case 110 fully surround the cooling ducts 42, 44, 46, and 48 of the battery module (refer to 50 in FIG. 1).

Referring to FIG. 10, the vent structures 102, 104, 106, and 108 of the upper case 110 respectively communicate with the cooling ducts 42, 44, 46, and 48 of the battery module 50, For brevity, when one 102 of the vent structures 102, 104, 106, and 108 is selected, an inner air passage unit 69a of the vent structure 102 opens toward the cooling duct 42 in one direction D1 and coupled to the air passing hole 35 of the cooling duct 42, and opens toward a side portion of the housing 70 of the upper case 110 in another direction D2 that is at a right angle to the one direction D1.

The vent structure 102 includes the inner air passage unit 69a, which forms the air passage (refer to P1 in FIG. 5) along an opening direction of the air passing hole 35 of the cooling duct 42 and perpendicular to the opening direction, and an outer air passage unit 95a, which is inserted along an inner wall of the inner air passage unit 69a and hooked to a fastening piece 67 through a hook 89.

The inner air passage unit 69a has the flow-path connection units (refer to 66 in FIG. 5) at an inner end portion of the connection end 63 and an end portion of the partition wall 68, and the flow-path connection units 66 are in close contact with edges of the air passing holes 35 of the cooling duct 42. The inner air passage unit 69a surrounds the outer air passage unit 95a.

In one aspect, the inner air passage unit 69a defines the air passage P1 on the air passing hole 35 of the cooling duct 42. The outer air passage unit 95a is fitted in the window frame (refer to 61 in FIG. 4) of the inner air passage unit 69a and engaged with the latching protrusion (refer to 65 in FIG. 4) on the connection end 63 of the window frame 61. The hooks 89 of the outer air passage unit 95a are coupled to the fastening pieces 67 of the inner air passage unit 69a, respectively.

Next, a method of manufacturing a battery pack and an operation mechanism of the battery pack according to an embodiment of the present disclosure will be described with reference to FIGS. 1 and 10.

Referring to FIGS. 1 and 10, a lower case 5, a battery module 50, and an upper case 110 may be prepared. The lower case 5 may be formed as a box type and open toward the upper case 110. Next, the battery module 50 may be accommodated in the lower case 5 and have battery cartridges 20, battery cells C, and cooling ducts 42, 44, 46, and 48.

The battery cartridges 20 may be sequentially stacked. The battery cells C may be inserted between two adjacent battery cartridges 20. The cooling ducts 42, 44, 46, and 48 may be located at opposite sidewalls of the battery cartridges 20. Subsequently, a sealing member 8 may be attached to the lower case 5 along an upper edge of the lower case 5. The sealing member 8 may include bond, silicone, rubber, or urethane.

Thereafter, the upper case 110 may be closely attached to the sealing member 8 on the lower case 5 so as to cover the battery module 50. In this case, in the upper case 110, inner air passage units 69a, 69b, 69c, and 69d of vent structures 102, 104, 106, and 108 may be coupled to air passing holes 35 of the cooling ducts 42, 44, 46, and 48 through flow-path connection units 66.

The air passing holes 35 may be attached to the flow-path connection units 66 by using a sealing member. Next, the outer air passage units 95a, 95b, 95c, and 95d are fitted along inner walls of the inner air passage units 69a, 69b, 69c, and 69d, the outer air passage units 95a, 95b, 95c, and 95d may be naturally fitted on the connection ends 63 of the window frames (refer to 61 in FIG. 4) of the inner air passage units 69a, 69b, 69c, and 69d.

The hooks 89 of the outer air passage unit 95a, 95b, 95c, and 95d may be hooked to the fastening pieces 67 of the inner air passage units 69a, 69b, 69c, and 69d, respectively. Thus, the lower case 5, the battery module 50, and the upper case 110 may constitute the battery pack 120.

A cooling mechanism of the battery pack 120 will now be described. During the driving of a blowing fan (not shown) installed in the cooling duct 46, on one side of the upper case 110, the outer air passage unit 95a of the battery pack 120 may allow the inflow of air through the through holes 81 of the front wall (refer to S1 in FIG. 6) and through the through holes 85 of the downward bottom (refer to S2 in FIG. 7) between the front wall S and the rear wall (refer to S3 in FIG. 7), and allow the outflow of air from the through holes (refer to 87 in FIG. 8) of the rear wall S3 toward the inner air passage unit 69a along flow lines F0 and F1.

The outflowed air absorbs heat from the battery cells C while passing through the inside of an air flow path of the battery cartridge 20 through air induction tools 14 and 15 located on one side of each of the battery cartridges 20. Thereafter, the outflowed air is discharged through air induction tools 17 and 18 located on the other side of each of the battery cartridges 20.

In addition, during the driving of the blowing fan of the cooling duct 46, on the other side of the upper case 110, the outer air passage unit 95c of the battery pack 120 may allow the inflow of air, which is heated while passing through the air flow path of each of the battery cartridges 20 through the through holes 87 of the rear wall S3 from the air passage unit 69c, and allow the outflow of air through the through holes 81 of the front wall S1 and through the through holes 85 of the downward bottom S2 between the front wall S1 and the rear wall S3 along flow lines F2 and F3.

Accordingly, during the driving of the blowing fan of the cooling duct 46, the battery pack 120 may allow air to flow from the outside toward the inside through the outer air passage unit 95a and the inner air passage unit 69a and pass through the air flow paths of the battery cartridges 20. The air, which is heated through the air flow paths, may flow from the inside toward the outside through the inner air passage unit 69c and the outer air passage unit 95c.

While the present disclosure has been particularly shown and described with reference to exemplary embodiments thereof, it will be understood by those of ordinary skill in the art that it is capable of various changes and modifications without departing from the scope of the present disclosure as defined by the following claims.

What is claimed is:

1. A battery pack comprising:
a battery module comprising battery cells sequentially stacked, air flow paths between the battery cells, and at least one cooling duct located on an outermost side of the battery cells to define an air flow space configured to communicate with the air flow paths, the at least one cooling duct having an air passing hole open toward an upper portion of the battery module to communicate with the air flow space;
a lower case configured to load the battery module and the at least one cooling duct therein, the lower case being separate from the at least one cooling duct; and
an upper case coupled to the lower case and configured to cover the battery module and the at least one cooling duct, the upper case having a vent structure on each cooling duct of the at least one cooling duct,
wherein the at least one cooling duct is located between the lower case and the battery cells, and
wherein the vent structure comprises an inner air passage unit configured to define an air passage and having a rectangular-tunnel-type window frame configured to communicate with the air passing hole through one side of the air passage and penetrate a sidewall of the upper case through the other side of the air passage, and an outer air passage unit detachably inserted along an inner wall of the window frame, the outer air passage unit having through holes in a front wall located on a front side of the window frame and in a rear wall located on a rear side of the window frame, and the outer air passage unit is entirely located within an outermost perimeter of a sidewall of the lower case.

2. The battery pack of claim 1, wherein the lower case has an end portion located at the same level along an upper edge thereof, and is closely attached to the upper case through a sealing member along the upper edge of the lower case.

3. The battery pack of claim 1, further comprising battery cartridges between the battery cells,
wherein each of the battery cartridges comprises:
an outer frame;
a lower cooling fin and an upper cooling fin fixed to an edge of the outer frame and spaced a predetermined distance apart from each other; and
air induction tools located on both sides of the outer frame to open the air flow path between the lower cooling fin and the upper cooling fin.

4. The battery pack of claim 3, wherein the at least one cooling duct opens toward the air induction tools of each of the battery cartridges through the air flow space.

5. The battery pack of claim 1, wherein the air passing hole of the at least one cooling duct is lower than an uppermost level of the battery module.

6. The battery pack of claim 1, wherein the battery module comprises a plurality of cooling ducts on both sides thereof,
wherein the air passing holes of the respective cooling ducts are located at the same level.

7. The battery pack of claim 1, wherein the at least one cooling duct is surrounded by the lower case and the upper case.

8. The battery pack of claim 1, wherein two cooling ducts are located on each of both sides of the battery cells.

9. The battery pack of claim 1, wherein the vent structure is located at a sidewall of an edge of a long side of the upper case.

10. The battery pack of claim 1, wherein the inner air passage unit surrounds the outer air passage unit.

11. The battery pack of claim 1, wherein the inner air passage unit is tightly coupled to an edge of the air passing hole of the at least one cooling duct through a sealing member.

12. The battery pack of claim 1, wherein the inner air passage unit comprises:
   the rectangular-tunnel-type window frame located at a sidewall of a housing of the upper case;
   a connection end configured to form a step from a front side to a rear side of the window frame on a lower side of the window frame;
   a strap-shaped latching protrusion protruding from an inner wall of the window frame along an inner edge of the window frame on the connection end; and
   a partition wall protruding from the housing toward the at least one cooling duct on an opposite side of the connection end.

13. The battery pack of claim 12, wherein the inner air passage unit has flow-path connection units at an inner end portion of the connection end and an end portion of the partition wall in a lower portion of the housing of the upper case, and the flow-path connection units are in contact with an edge of the air passing hole of the at least one cooling duct.

14. The battery pack of claim 13, wherein each of the flow-path connection units has an inverted 'U'-shaped groove structure at an end portion thereof.

15. The battery pack of claim 14, wherein each of the flow-path connection units has a sealing member in the groove structure and is closely attached to the air passing hole through the sealing member.

16. The battery pack of claim 12, wherein both sidewalls of the window frame have fastening pieces protruding from the latching protrusion toward the partition wall at rear end portions thereof.

17. The battery pack of claim 16, wherein the outer air passage unit has hooks, which protrude from the rear wall and are coupled to the fastening pieces of the inner air passage unit.

18. The battery pack of claim 1, wherein, on one side of the upper case, the outer air passage unit allows inflow of air through the front wall and through a downward bottom between the front wall and the rear wall and allows outflow of air from the rear wall toward the inner air passage unit.

19. The battery pack of claim 18, wherein, another vent structure is provided on another side of the upper case opposite the one side, an outer air passage unit of the another vent structure is provided that allows inflow of air from an inner air passage unit of the another vent structure toward a rear wall and allows outflow of air through a front wall and through a downward bottom between the front wall and the rear wall.

20. The battery pack of claim 1, wherein the outer air passage unit has sidewalls between the front wall and the rear wall,
   each of the sidewalls protrudes from a downward bottom under the front wall and the rear wall, and
   a height of a protruding portion of each of the sidewalls gradually decreases from the front wall toward the rear wall.

21. The battery pack of claim 20, wherein the downward bottom has through holes.

* * * * *